United States Patent
Miyahara et al.

(12) 
(10) Patent No.: US 6,952,278 B2
(45) Date of Patent: Oct. 4, 2005

(54) PROCESSING OF MULTIPLE DATA TRANSFER JOBS

(75) Inventors: Nobuaki Miyahara, Tokyo (JP); Hiroshi Sumio, Tokyo (JP); Hirohiko Itoh, Yokohama (JP); Bungo Shimada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/314,123

(22) Filed: May 19, 1999

(65) Prior Publication Data

US 2003/0011800 A1 Jan. 16, 2003

(30) Foreign Application Priority Data

May 21, 1998 (JP) ............................................ 10-155395

(51) Int. Cl.[7] ........................... G06F 13/00; G06K 15/02

(52) U.S. Cl. ..................... 358/1.15; 358/1.13; 358/1.14
(58) Field of Search .................................. 358/1.15, 1.9, 358/1.13, 1.14, 1.16; 345/333, 357, 326

(56) References Cited

U.S. PATENT DOCUMENTS 5,493,408 A * 2/1996 Kurogane et al. .......... 358/296

* cited by examiner

*Primary Examiner*—Douglas Tran
(74) *Attorney, Agent, or Firm*—Fitzpatrick, Cella, Harper & Scinto

(57) ABSTRACT

A data processing apparatus executes a plurality of types of jobs. In this apparatus, it is determined whether the execution history of each type of job is to be indicated. The execution history is stored if it is determined that it is to be indicated. The execution history is then transmitted to a PC on a network connected to the data processing apparatus and is displayed as a history list.

16 Claims, 11 Drawing Sheets

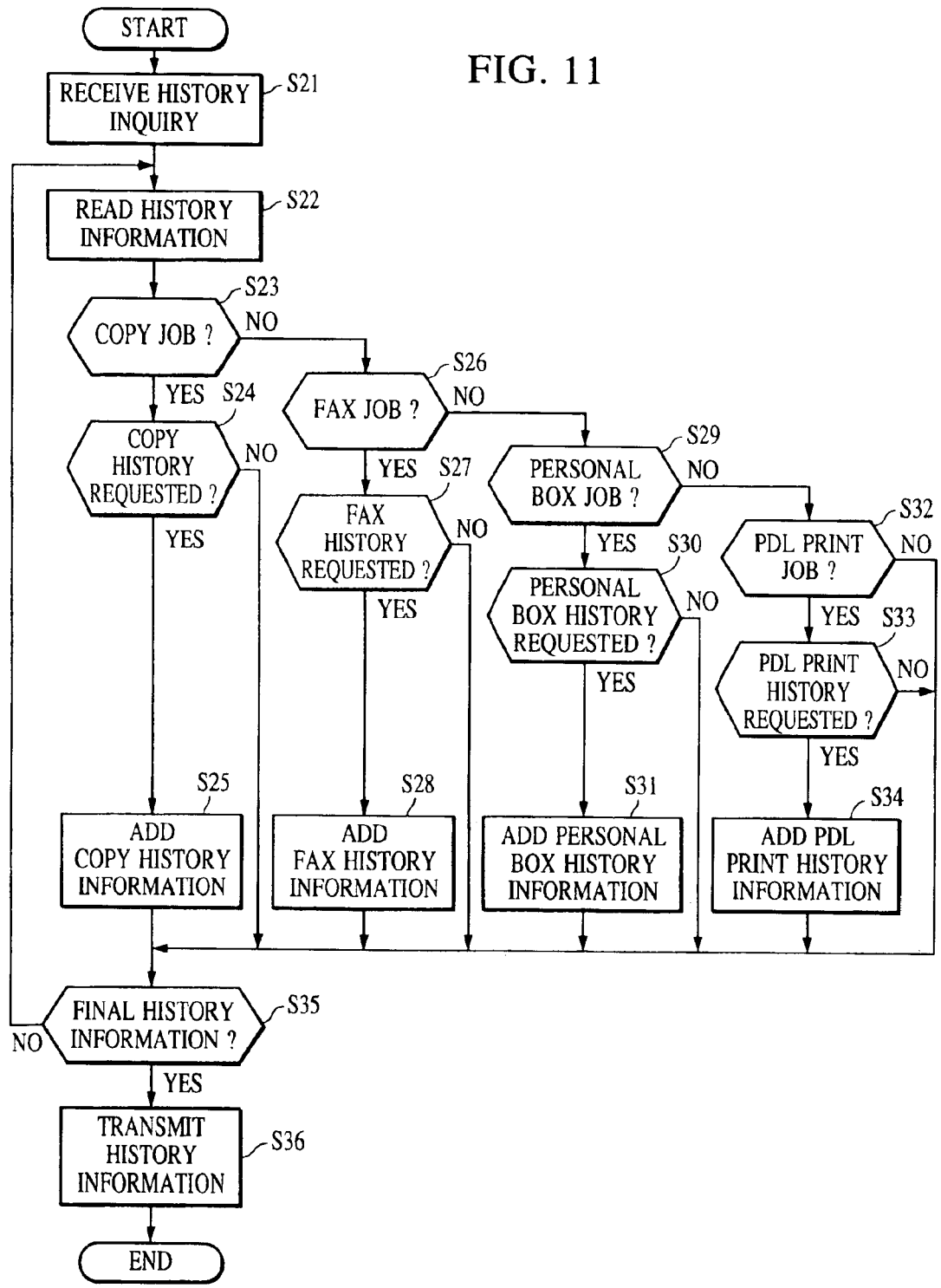

PROCESSING OF MULTIPLE DATA TRANSFER JOBS

BACKGROUND OF THE INVENTION

1. Field of the Invention

The present invention relates to a data processing method and apparatus for executing various data transfer jobs, and reporting the status of the data transfer jobs.

2. Description of the Related Art

Conventional digital copying machines obtain image data by reading an image formed on an original document by using a scanner, or bit-map image data expanded from a page description language (PDL) transmitted from a personal computer (PC) via a network. This image data is temporarily stored in a memory, such as a hard disk, within the copying machine. The image data is then read from the memory and printed.

Some conventional digital copying machines include a reserve copying function. That is, a memory, such as a large-capacity hard disk, is provided as an image buffer for the copying machine, and a scanner and a printer are separated within the copying machine. With this arrangement, even when the printer is in the warm-up state or is occupied with another type of job, a subsequent copying job can be accepted and reserved if the scanner is unoccupied.

By virtue of the above-described reserve copying function, even if the copying machine is occupied with many copying jobs, a subsequent copying job can be accepted as long as the input of an image from the scanner into the memory is completed, thereby increasing the throughput of the copying function.

When multiple copy jobs are involved, a PC may wish to check the execution state of each job. Conventionally, however, when a PDL print job issued by a PC is transferred from a print server on a network to a copying machine, the completion of the job is disadvantageously reported to the PC. It is thus difficult to determine whether a job issued by the PC has actually been completed.

Also, a copy job may be canceled while being executed, or may be abnormally terminated for any number of reasons. In this case, it is also difficult to ascertain in which manner the job issued by the PC has been terminated.

Additionally, in an apparatus for executing a plurality of types of jobs, there may be some jobs which do not require checking. Conventionally, however, it has been impossible to determine which jobs require checking.

SUMMARY OF THE INVENTION

Accordingly, it is an object of the present invention to provide a data processing apparatus and a control method therefor, free from the above-described problems.

It is another object of the present invention to provide a data processing apparatus that is capable of informing the execution state of jobs via a network, and also to provide a control method for this type of apparatus.

It is a further object of the present invention to provide a data processing apparatus that is capable of dividing jobs by types and managing the history of the jobs, and also to provide a control method for this type of apparatus.

According to one aspect of the present invention, an apparatus for processing data transfer jobs is provided. The apparatus includes a first memory, a second memory, a controller and an interface circuit. The first memory inputs and stores data for each of a plurality of jobs, and transfers the data for each of the plurality of jobs to an output device. When a transfer of data from the first memory has ended for a given job, the controller stores history information for the given job in the second memory. The interface circuit receives a status inquiry and forwards the status inquiry to the controller. Upon receipt of the status inquiry, the controller retrieves the history information from the second memory, and sends the retrieved history information to the interface circuit.

According to another aspect of the present invention, there is provided a data processing apparatus including connection means for connecting to an external device. Input means inputs an instruction to execute a job. Processing means processes the job based on the instruction input by the input means. Informing means informs a result of the job processing executed by the processing means to the external device through the connection means.

According to another aspect of the present invention, there is provided a control method of a data processing apparatus executing a job, including the steps of discriminating a result of the job executed by the data processing apparatus, and informing the discriminated result of the job to an external device connected to the data processing apparatus.

According to a further aspect of the present invention, there is provided a computer readable program, stored in a storage medium, for controlling a data processing apparatus executing a job. The computer readable program includes the steps of discriminating a result of the job executed by the data processing apparatus, and informing the discriminated result of the job to an external device connected to the data processing apparatus.

Further objects, features and advantages of the present invention will become apparent from the following description of the preferred embodiment with reference to the attached drawings.

BRIEF DESCRIPTION OF THE DRAWINGS

FIG. 11 is a flowchart illustrating the processing executed in response to a job history inquiry from a terminal on a local area network (LAN).

DESCRIPTION OF THE PREFERRED EMBODIMENT

An embodiment of the present invention is described below with reference to the drawings.

Figure 1:
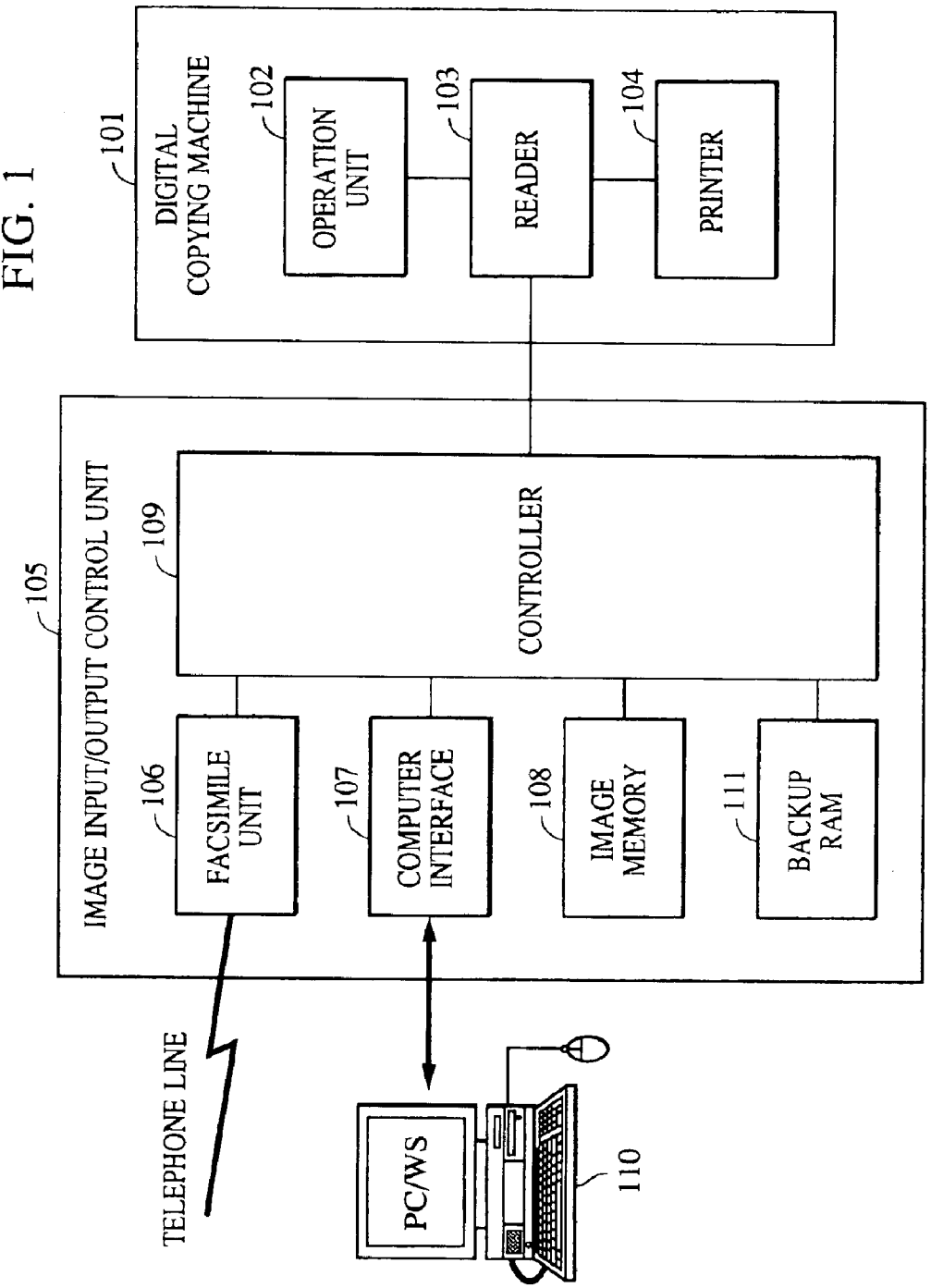
FIG. 1 is a block diagram of an image forming apparatus according to an embodiment of the present invention.

In FIG. 1, a digital copying machine 101 is formed of an operation unit 102, a reader 103, and a printer 104. The operation unit 102 is used for operating the digital copying machine 101 and the image input/output control unit 105. The reader 103 reads an image formed on an original document, and then outputs image data corresponding to the original image to the printer 104 and to the image input/output control unit 105.

The printer 104 prints an image on a recording sheet in accordance with image data output from the reader 103 and the image input/output control unit 105. The image input/output control unit 105 is connected to the reader 103, and is comprised of a facsimile unit 106, a computer interface 107, an image memory 108, such as a hard disk, a controller 109, and a backup random access memory (backup RAM) 111.

The facsimile unit 106 expands compressed image data received via a telephone line and then transfers the expanded image data to the controller 109. The facsimile unit 106 also compresses image data transferred from the controller 109 and then transmits the compressed image data via the telephone line. The compressed image data received by the facsimile unit 106 may be temporarily stored in the image memory 108.

The computer interface 107 serves as an interface between a print server 110, which is formed of a personal computer or a workstation (PC/WS), and the controller 109. The computer interface 107 expands code data (PDL) representing an image transferred from the PC/WS 110 into image data that can be recorded by the printer 104, and then delivers the expanded image data to the controller 109. The print server 110 is connected to a local area network (LAN) on which a plurality of terminals are connected.

The controller 109 controls the data flow between the reader 103, the facsimile unit 106, the computer interface 107, and the image memory 108.

The backup RAM 111, which is a non-volatile memory, is used for storing therein backup data of the digital copying machine 101 and the image input/output control unit 105.

Figure 2:
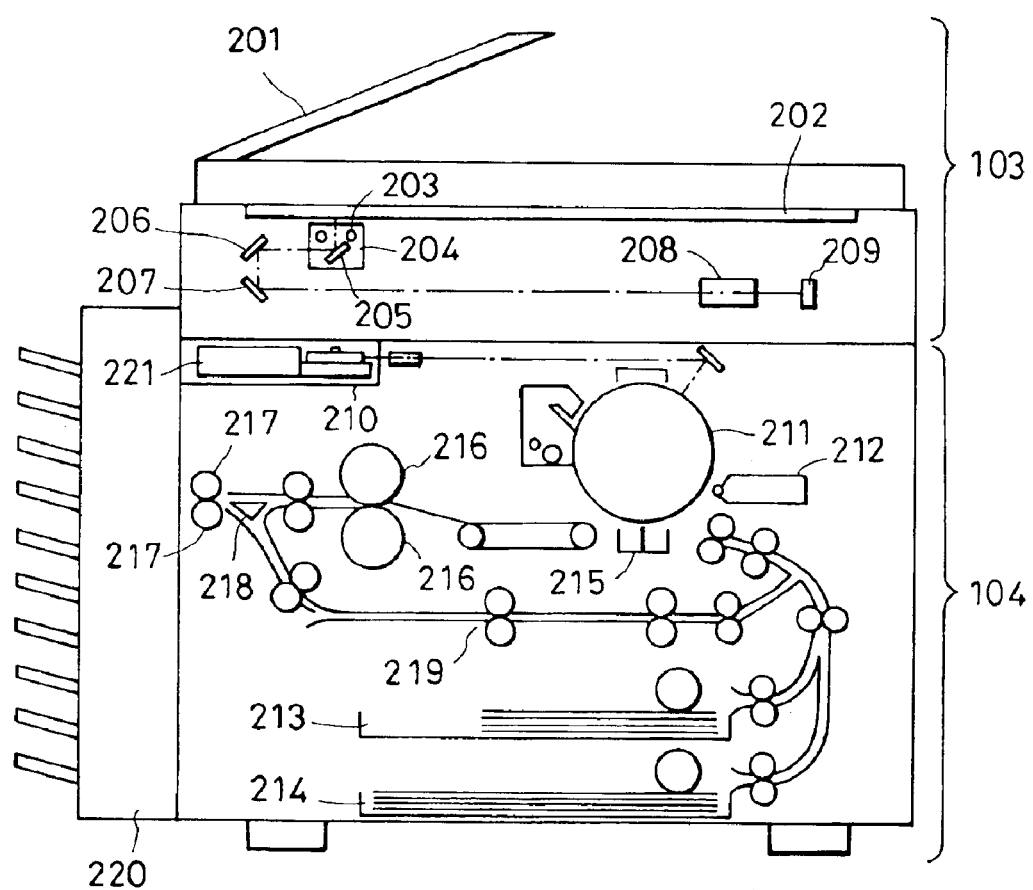
FIG. 2 is a schematic sectional view illustrating a digital copying machine for use in the image forming apparatus shown in FIG. 1.

FIG. 2 is a schematic sectional view illustrating the digital copying machine 101 formed of the reader 103 and the printer 104. In the reader 103, a document feeder 201 feeds original documents one by one onto a platen glass 202, and discharges them after reading images formed on the documents. Upon starting the feeding of the documents onto the platen glass 202, a lamp 203 is lit to start the shifting of a scanner unit 204 and causes it to scan the documents. The light reflected by the document passes through mirrors 205, 206, and 207, and a lens 208, and further travels to a charge-coupled device (CCD) image sensor (hereinafter simply referred to as a "CCD") 209, all in a conventional manner.

In this manner, the scanned document image is read by the CCD 209, and is then output and undergoes predetermined processing. The resulting image data is then transferred to the printer 104 and to the controller 109 of the image input/output control unit 105 (shown in FIG. 1).

In the printer 104, a laser driver 221 drives the laser emitting portion 210 to emit laser light corresponding to the image data input from the reader 103. The laser light is then applied to a photosensitive drum 211 to form a latent image on the photosensitive drum 211 in response to the laser light. A developer is then attached to the latent image by a developer unit 212.

In synchronization with the start of exposing the photosensitive drum 211 to laser light, recording sheets are fed from a cassette 213 or 214 to a transfer unit 215, which then transfers the developer attached on the photosensitive drum 211 to the recording sheets. The recording sheets with the developer are then fed to a fixing unit 216, and the developer is fixed on the recording sheets by heat and pressure supplied from the fixing unit 216.

After passing through the fixing unit 216, the recording sheets are discharged by discharging rollers 217. A sorter 220 sorts the sheets by storing them in respective bins, or staples the sorted sheets. If the sorting function is not set, the sorter 220 stores the sheets in the uppermost bin.

In performing double-sided recording, when a recording sheet is fed to the discharging rollers 217, the rotational direction of the discharging rollers 217 is reversed to feed the sheet to a re-feeding passage 219 by a flapper 218. In performing multiple-recording, a recording sheet is fed to the re-feeding passage 219 by the flapper 218 before the sheet reaches the discharging rollers 217. The recording sheet that has reached the re-feeding passage 219 is fed to the transfer unit 215 in synchronization with the start of exposing the photosensitive drum 211 to laser light.

Figure 3:
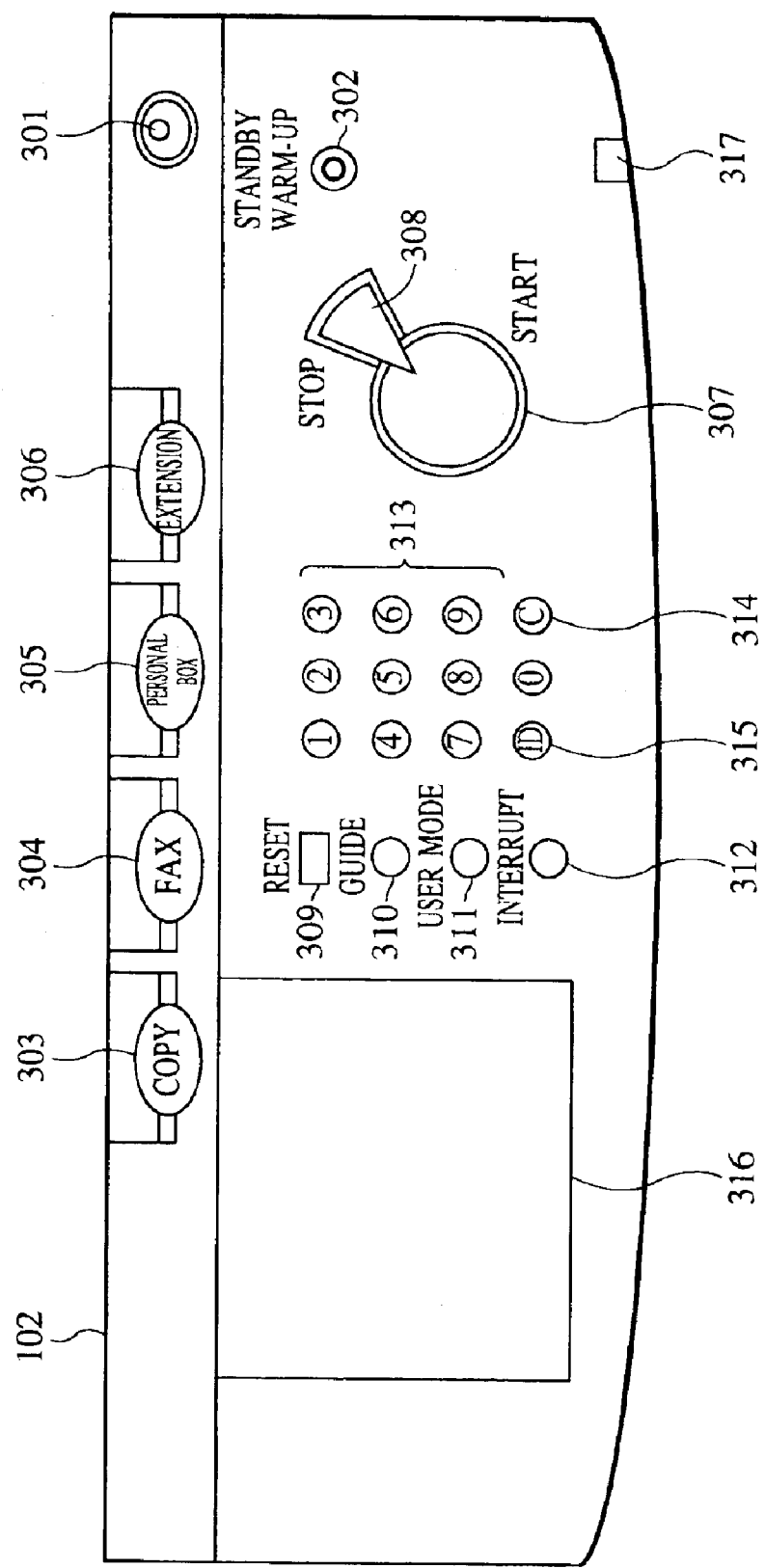
FIG. 3 illustrates the key arrangement of an operation unit of the digital copying machine shown in FIG. 2.

FIG. 3 illustrates the key arrangement of the operation unit 102 of the digital copying machine 101.

The operation unit 102 includes a power switch 301, which controls power supply to the copying machine 101, a standby warm-up key 302 used for switching on or off the standby warm-up mode, a copy mode key 303 used for selecting the copy mode from among a plurality of functions, and a fax mode key 304 used for selecting the fax mode from among the plurality of functions.

A personal box key 305 is used for selecting the personal box mode from among the plurality of functions. The personal box function provides a storage area for the image memory 108 of the digital copying machine 101 for each user or company department. Received PDL data and scanned images from the reader 103 are stored in this storage area and are subsequently output as desired.

An extension key 306 is used when a printing operation is performed on PDL data. A copy start key 307 is used when starting a copying operation. A stop key 308 is used for discontinuing the processing during execution. A reset key 309 is used, for example, to switch from the standby mode to the standard mode.

A guide key 310 is used for displaying the guides of the individual functions. A user mode key 311 is used when the user changes the basic setting of the system. An interrupt key 312 is used when interrupting the current copying operation to perform another copying operation. A numeric keypad 313 is used for inputting numbers. A clear key 314 is used for clearing the input number.

An ID key 315 is used when shifting to the ID input mode, which is required for using the digital copying machine 101. A touch panel 316, which is preferably a conventional combination of a liquid crystal screen and a touch sensor, displays the individual keys and setting screens for the respective modes, and also enables various detailed settings when the user touches the displayed keys. The combination of the touch sensor and the "keys" displayed on the touch panel 314 simulates individual pushbuttons, in a conventional manner. A tally lamp 317, which is normally constantly green, indicates the communication state of a network. The green tally lamp 317 blinks when communications are being performed, and changes to red when a network error occurs.

Figure 4:
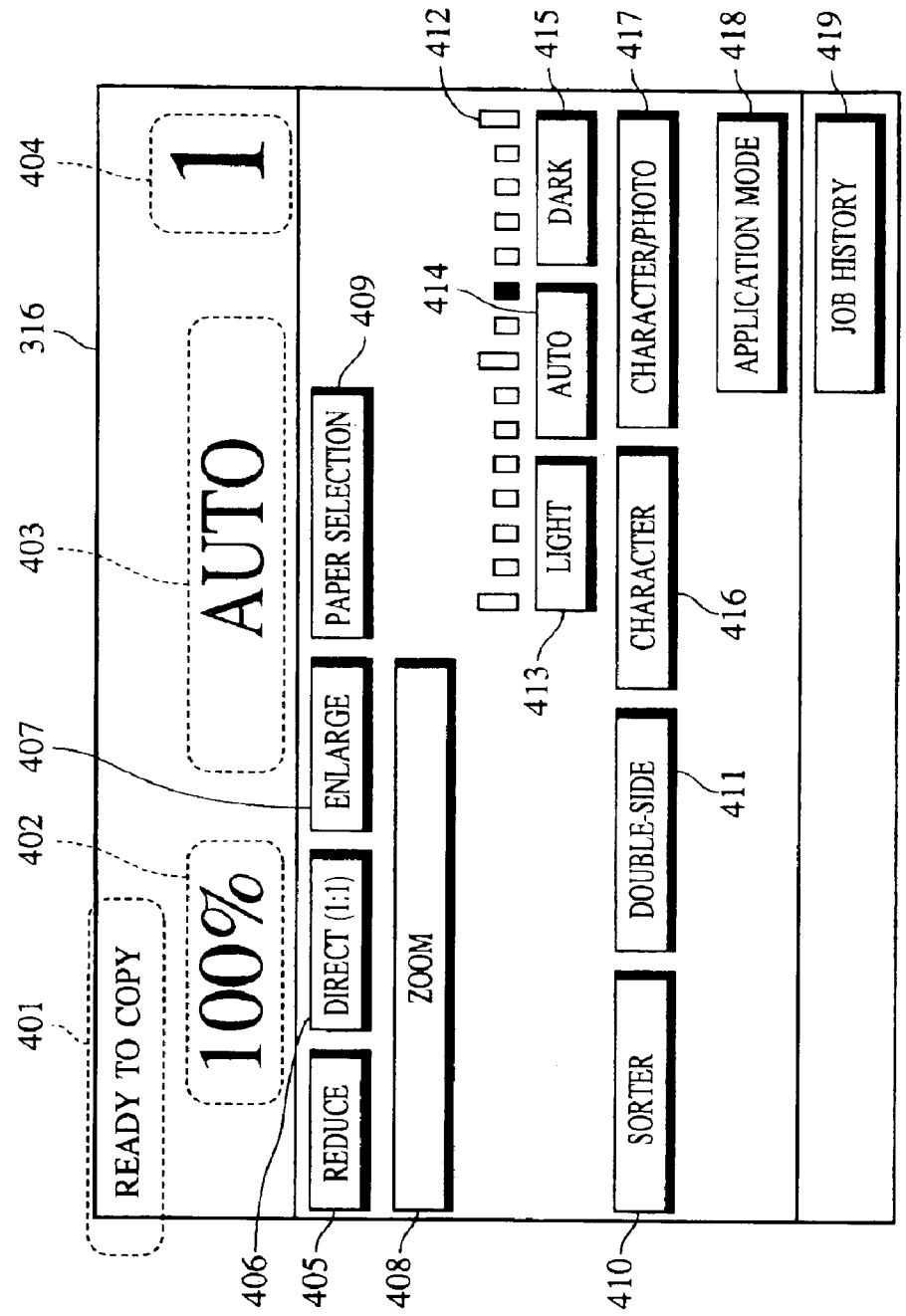
FIG. 4 illustrates the copy standard screen on an operation panel of the operation unit shown in FIG. 3.

FIG. 4 illustrates the copy standard screen on the operation panel 316 according to this embodiment. The image forming apparatus of this embodiment is set to start with the copy standard screen by default when power is supplied.

In FIG. 4, reference numeral 401 indicates a message area that indicates the statuses of copy jobs in various messages. Reference numeral 402 indicates a copying ratio, in percent, which is set by the user or is automatically determined by the copy mode. A paper size indicator 403 designates the selected size of paper, and indicates "auto" when the auto paper selection is set. A numeric indicator 404 indicates the required number of copies.

A reduce key 405 is used when a copying operation is performed to reduce the size. A direct (1:1) key 406 is used for returning the copy ratio to 100%. An enlarge key 407 is used when a copying operation is performed to enlarge the size. A zoom key 408 is used when a copying operation is performed to reduce the size or to enlarge the size by setting a desired copying ratio.

A paper selection key 409 is used for designating the size of paper. A sorter key 410 is used for setting the sort mode or the staple mode. A double-sided copying key 411 is used for setting the double-sided copying mode.

A color density indicator 412 indicates the currently set color density of prints. Darker copies are indicated toward the right side and lighter copies are indicated toward the left side. The density indicator 412 changes the indication in cooperation with a color lightening key 413 and a color darkening key 415. The color lightening key 413 is used for making the printed color lighter, while the color darkening key 415 is used for making the printed color darker. An auto key 414 is used for automatically setting the color density of prints.

A character key 416 is used for setting the character mode, which automatically determines the image processing mode suitably used for copying documents containing characters only. A character/photo key 417 is used for setting the character/photo mode, which automatically determines the image processing mode suitably used for copying documents containing characters and photos.

An application mode key 418 is used for setting various copy modes that cannot be set on the copy standard screen. A print status key (job history) 419 is used for checking the status of the printing operation currently performed in the digital copying machine 101. The print status key 419 is indicated not only on the copy standard screen, but also always at this position on certain other screens. Accordingly, the print status can be checked at any time by pressing this key 419. When this key is pressed, the job history screen shown in FIG. 5 is displayed on the operation panel 316.

Figure 5:
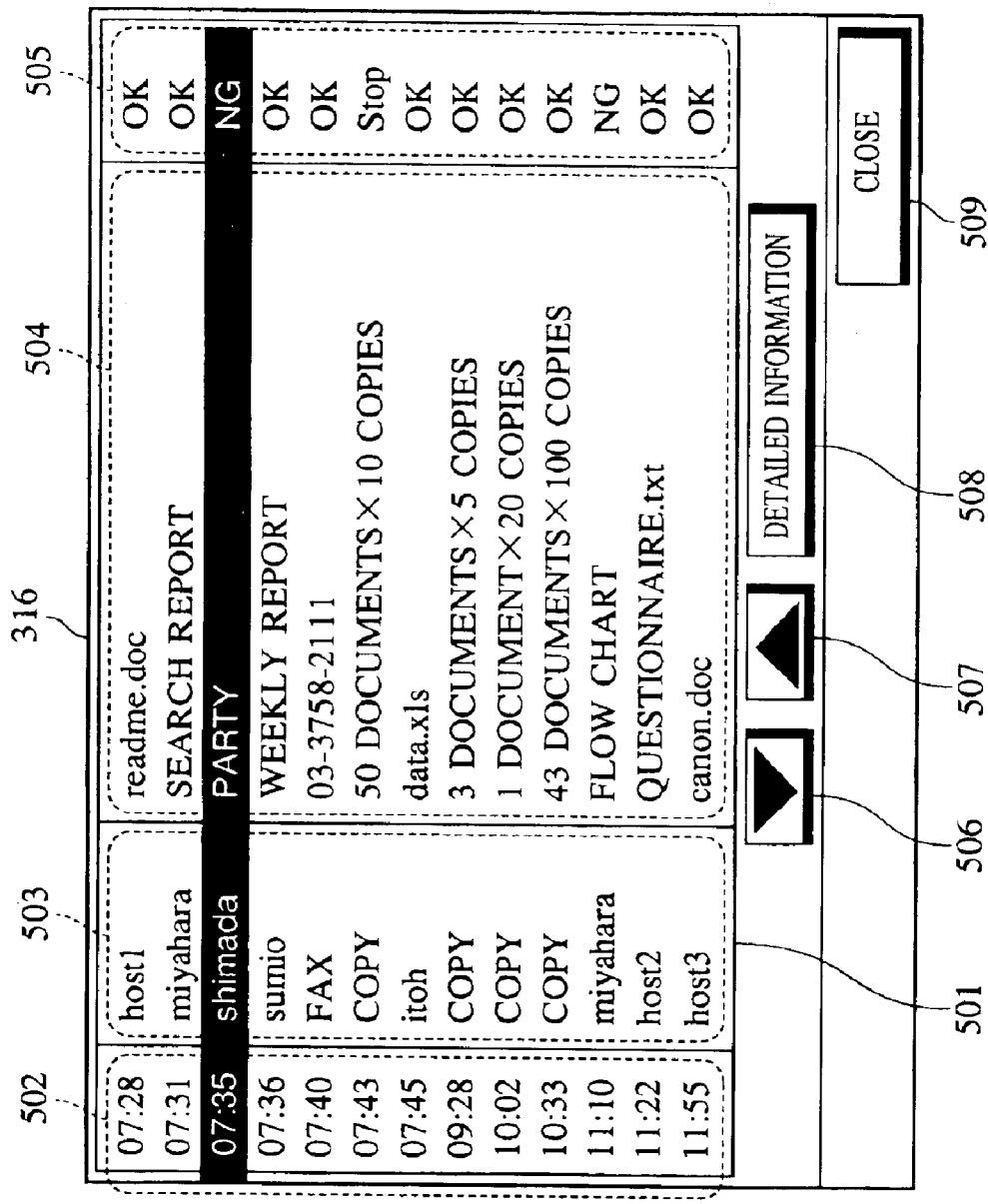
FIG. 5 illustrates a job history screen displayed on the operation panel.

In FIG. 5, a history list 501 indicates the jobs which have been executed in the image forming apparatus so far, and in this embodiment, the list is arranged in order of the time of each job was accepted. The time at which the jobs were accepted is shown in a field 502. In a field 503, the host name or the user name is shown if the job concerns a PDL print. If the job concerns a copying operation or a FAX operation, corresponding information is shown in the field 503.

In a field 504, the job name is indicated. The file name or the name of the used application software is shown in the field 504 if the job is for a PDL print. In contrast, if the job is for a copying operation, the number of original documents and the required number of copies are indicated. If the job is for a FAX operation, the FAX number is indicated. In a field 505, the execution result of each job is shown. "OK" is indicated when the job has been correctly completed; "NG" is indicated when the job has been abnormally terminated; and "Stop" is indicated when the job has been forced to terminate by, for example, the stop key 308 (shown in FIG. 3).

An upper scroll key 507 and a lower scroll key 506 are used for scrolling the history information displayed on the job history list 501 upward and downward, respectively, if all the jobs cannot be displayed on the screen of the job history list 501 simultaneously. A detailed information key 508 is used for checking the detailed information of the job selected (highlighted) from the job history list 501. When the detailed information key 508 is pressed, the job-history detailed-information screen appears. A close key 509 is used for closing the job history screen. By pressing the close key 509, the screen is returned to the copy standard screen shown in FIG. 4.

Figure 6:
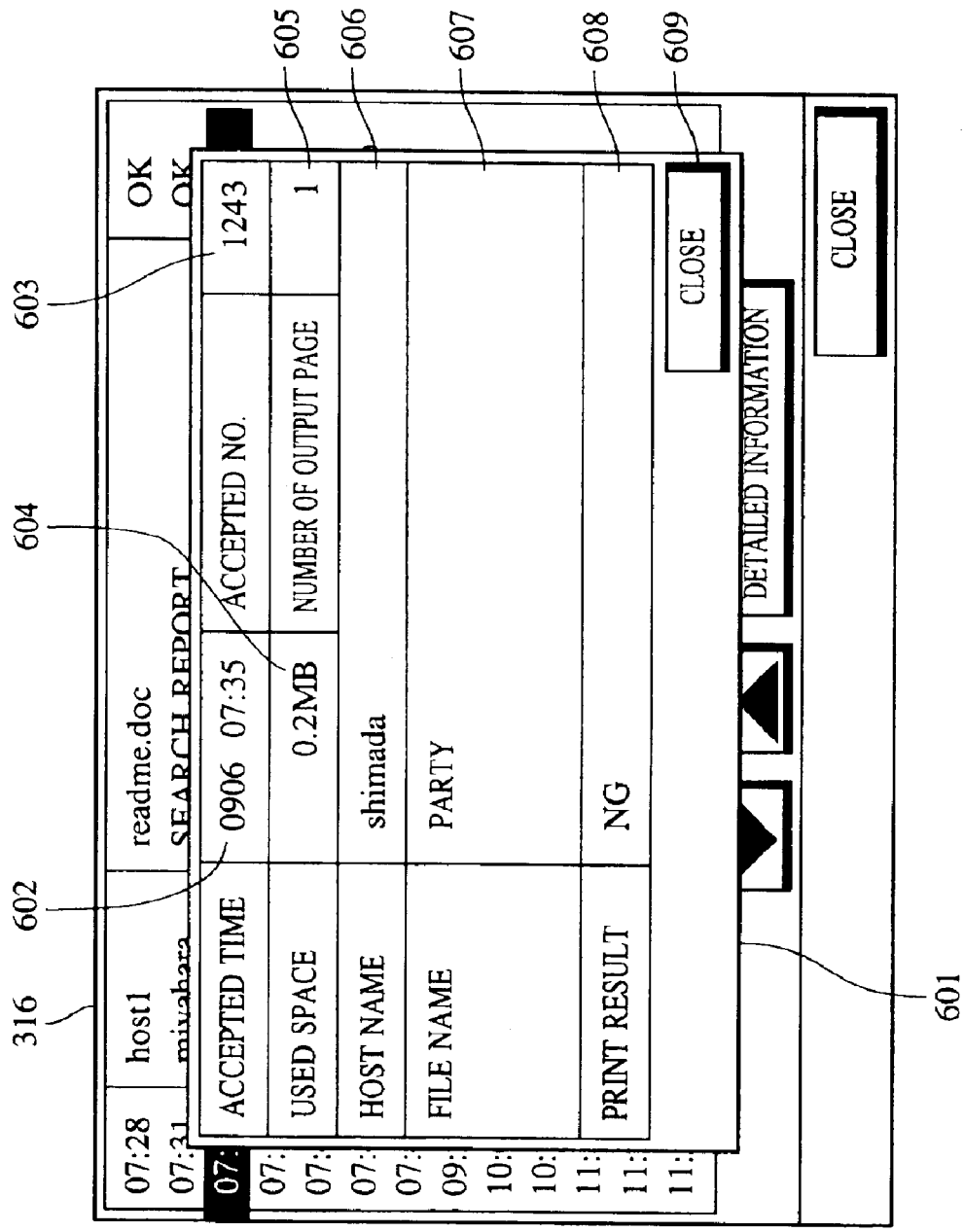
FIG. 6 illustrates a job-history detailed-information screen displayed on the operation panel.

FIG. 6 illustrates the job-history detailed-information screen displayed on the operation panel 316. Reference numeral 601 designates a job-history detailed-information window, which indicates the history detailed information of a print job. In the job-history detailed-information window 601, a job accepted time 602, a job accepted number 603, a job file size 604, and the number of pages output by the job 605 are shown. A user name or a host name is indicated in a field 606 if the job is for a PDL print. If the job is for a copying operation or a FAX operation, the corresponding information is indicated in the field 606.

The job name is shown in a field 607. If the job is for a PDL print, the file name is indicated in the field 607. If the job is for a copying operation, the number of original documents and the required number of copies are shown in the field 607. If the job is for a FAX operation, the FAX number is shown in the field 607. The execution result of the job is indicated in a field 608. "OK" is indicated when the job has been correctly completed; "NG" is indicated when the job has encountered an error and has been terminated; and "Stop" is indicated when the job has been forced to terminate by, for example, the pushing of the stop key 308 (shown in FIG. 3). Reference numeral 609 designates a close key. Upon pressing this key 609, the screen is returned to the job history screen shown in FIG. 5.

Figure 7:
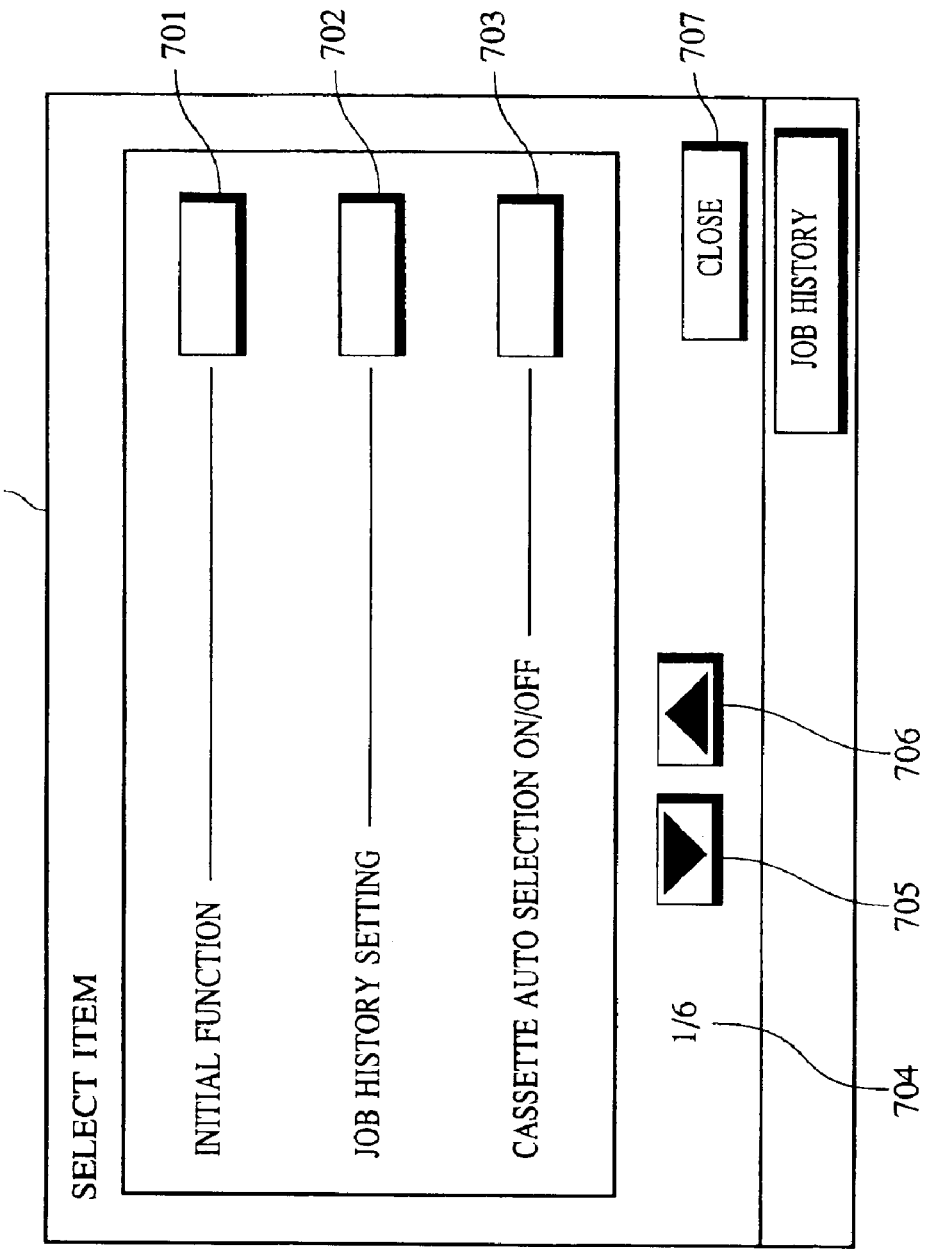
FIG. 7 illustrates a user setting screen displayed on the operation panel.

FIG. 7 illustrates the user setting screen displayed on the operation panel 316. The user setting screen can be opened by pressing the user mode key 311 (shown in FIG. 3), and various settings of the copying machine 101 can be performed through this screen. When an initial function key 701 is pressed, the screen for setting the initial screen of the operation panel 316 appearing at power supply start-up can be opened. By pressing a job-history setting key 702, the job-history setting screen shown in FIG. 8 can be opened. By pressing a cassette auto-selection on/off key 703, the screen for selecting the cassette which can be used with the automatic paper selecting function can be opened.

Reference numeral 704 designates the number of currently indicated items of the user setting screens in the form of a fraction (the number of currently displayed screen in relation to the total number of setting screens). An upper scroll key 706 and a lower scroll key 705 are used for scrolling the items of the user setting screen upward and downward, respectively, if all the items cannot be contained within one screen. A close key 707 is used for closing the user setting screen.

Figure 8:
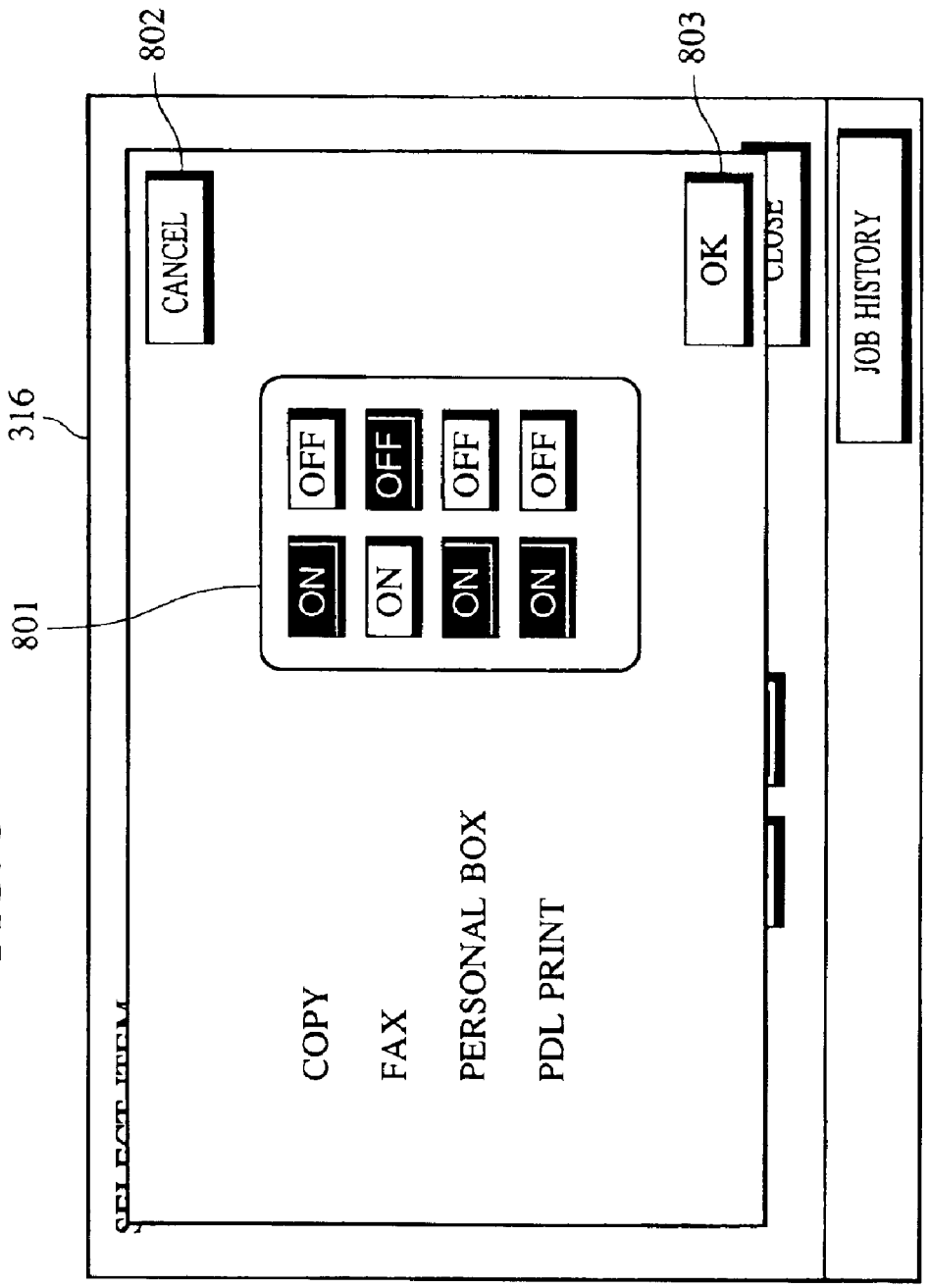
FIG. 8 illustrates a job-history setting screen displayed on the operation panel.

FIG. 8 illustrates the job-history setting screen displayed on the operation panel 316. An on/off key 801 is used for determining whether the history of each job is to be indicated on the job history screen shown in FIG. 5. By pressing the on/off keys 801, either "on" or "off" is set for each job. When the "on" key is pressed, the history of the job will be indicated. When the "off" key is pressed, the history of the job will not be indicated. By pressing a cancel key 802, the setting can be canceled, and the screen is returned to the user setting screen shown in FIG. 7. By pressing an OK key 803, the displayed setting can be stored in the backup RAM 111 shown in FIG. 1, and the screen is returned to the user setting screen shown in FIG. 7.

Figure 9:
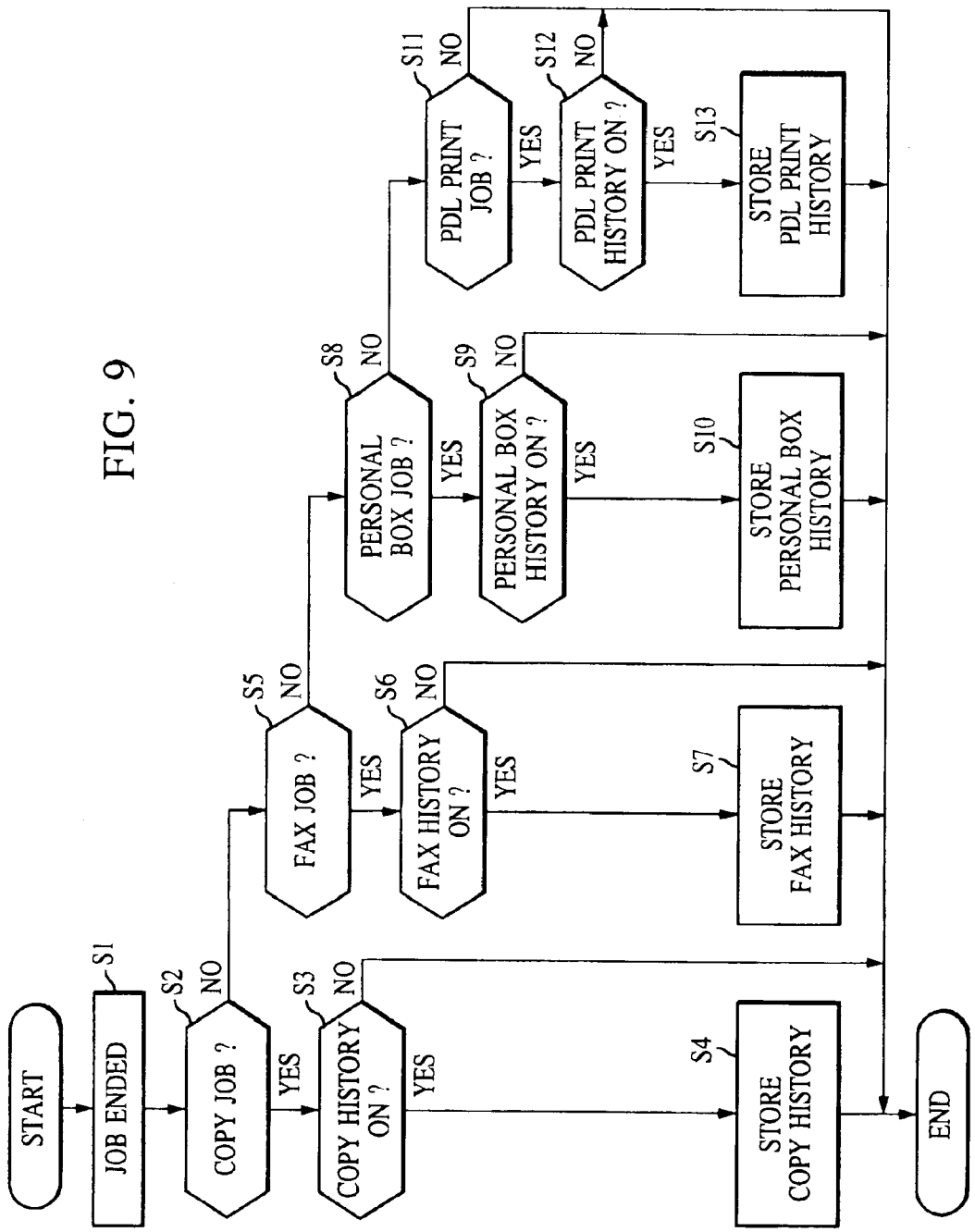
FIG. 9 is a flowchart illustrating a storage method for a job history.

FIG. 9 is a flow chart illustrating a storage method for the job history of the image forming apparatus into the job history display area of the backup RAM 111 according to this embodiment of the present invention.

No processing is performed for jobs that have not yet been terminated. In step S1, once the job is correctly completed or abnormally terminated, processing is allowed to proceed to step S2. It is determined in step S2 whether the job indicates a copy job. If the outcome of step S2 is yes, the process proceeds to step S3. If the result of step S2 is no, the process proceeds to step S5.

It is then checked in step S3 by reading the setting of the job history from the backup RAM 111 whether the history of the copy job is to be indicated. If the outcome of step S3 is yes, the flow proceeds to step S4. If the result of step S3 is no, the process is ended. In step S4, the history of the copy job is stored in the job history display area of the backup RAM 111.

If it is found in step S2 that the job is not a copy job, a determination is further made in step S5 of whether the job indicates a FAX job. If the job is a FAX job, the process proceeds to step S6. If the job is not a FAX job, the process proceeds to step S8. It is then checked in step S6 by reading the setting of the job history from the backup RAM 111 whether the history of the FAX job is to be indicated. If the outcome of step S6 is yes, the process proceeds to step S7. If the result of step S6 is no, the process is ended. In step S7, the history of the FAX job is stored in the job history display area of the backup RAM 111.

It is determined in step S8 whether the job is a personal box job. If the job is a personal box job, the process proceeds to step S9. If the job is not a personal box job, the process proceeds to step S11.

It is then checked in step S9 by reading the setting of the job history from the backup RAM 111 whether the history of the personal box job is to be indicated. If the outcome of step S9 is yes, the process proceeds to step S10. If the result of step S9 is no, the process is ended. In step S10, the history of the personal box job is stored in the job history display area of the backup RAM 111 in correspondence with the user information.

A determination is further made in step S11 whether the job indicates a PDL print job. If the job is a PDL print job, the process proceeds to step S12. If the job is not a PDL print job, the process is ended. It is checked in step S12 by reading the setting of the job history from the backup RAM 111 whether the history of the PDL print job is to be indicated. If the outcome of step S12 is yes, the process proceeds to step S13. If the result of step S12 is no, the process is ended. In step S13, the history of the PDL print job is stored in the job history display area of the backup RAM 111 in correspondence with the user information. In this manner, the job histories are divided by types of jobs and are stored in the backup RAM 111.

Figure 10:
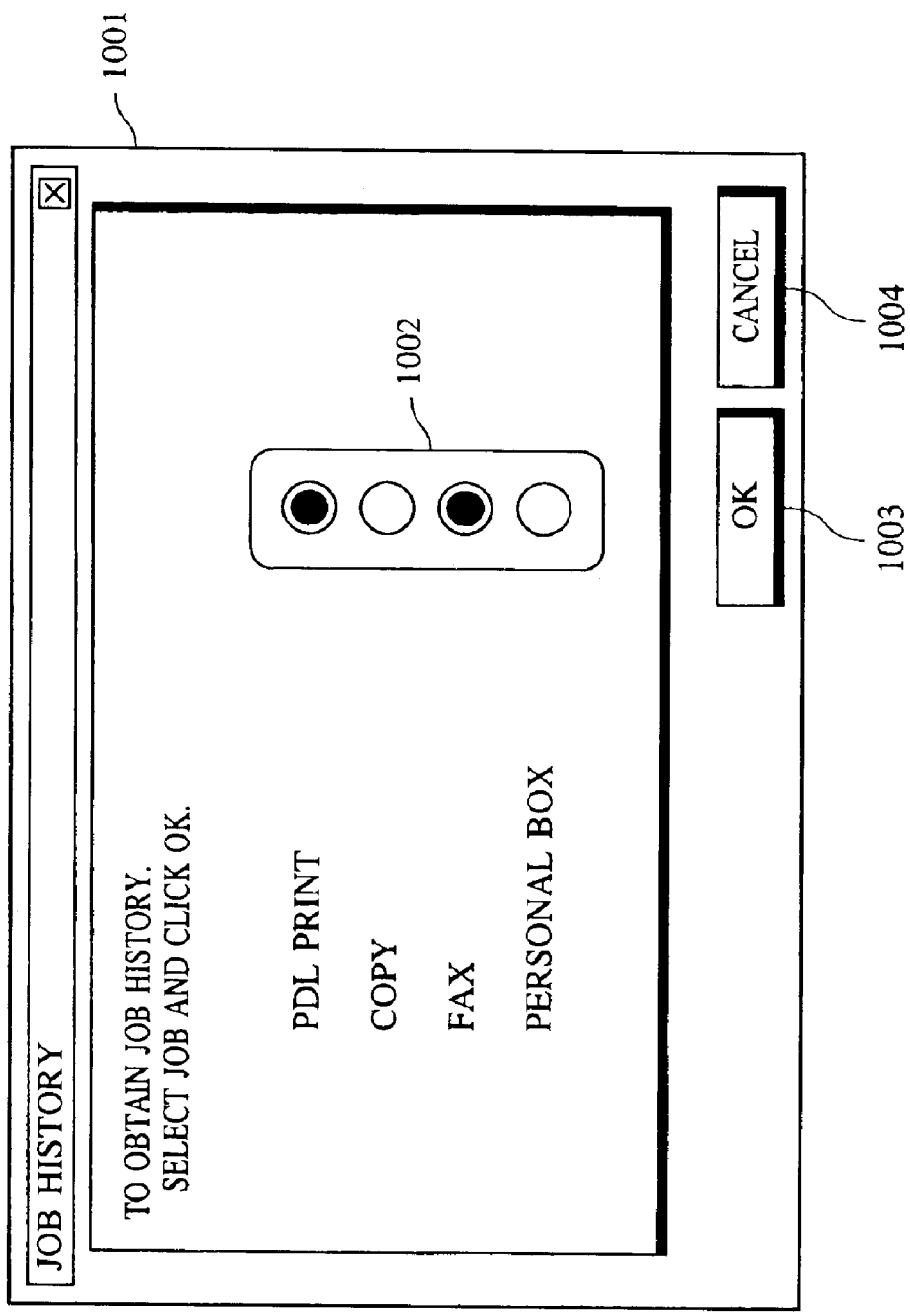
FIG. 10 illustrates a job-history window screen of a terminal (host), such as a PC.

FIG. 10 illustrates the job-history window screen of a host, such as a PC on a LAN. Reference numeral 1001 designates a job history window for obtaining the job history, which is started by a program built into a printer driver of the PC for the image forming apparatus of this embodiment. By pressing toggle buttons 1002, a plurality of types of jobs can be selected. (As used herein, the pressing of buttons and keys refers to actuating "buttons" that are displayed on a computer screen using, for example, a pointing device, such as a mouse. Alternative embodiments, including individual keyboard switches, may also be used.)

Upon pressing an OK key 1003, a command for acquiring the histories of the jobs selected by the toggle buttons 1002 is transmitted to the server 110 via a network. The command is further transmitted to the image input/output control unit 105 via the server 110, and the PC receives the job histories (which are stored in the job history display area of the backup RAM 111) in response to this command. Then, the job history or the job-history detailed information, such as the one shown in FIG. 5 or 6 is displayed on the display of the PC. A cancel key 1004 is used for closing the job history window 1001 without acquiring the job history.

FIG. 11 is a flow chart illustrating the processing executed by the image forming apparatus of this embodiment in response to receipt of a job history inquiry from the host.

In step S21, a job history inquiry is received from a terminal on a LAN via the print server 110. Then, in step S22, each item of history information is read from the job history display area of the backup RAM 111, and the process proceeds to step S23. It is determined in step S23 whether the job history information read in step S22 indicates a copy job. If the job is a copy job, the process proceeds to step S24. If the job is not a copy job, the process proceeds to step S26.

It is then checked in step S24 whether the history of the copy job has been requested. If the outcome of step S24 is yes, the process proceeds to step S25. If the result of step S24 is no, the process proceeds to step S35. In step S25, the history of the copy job read in step S22 is added to the data to be returned to the print server 110. The process then proceeds to step S35.

In step S26, it is determined whether the job history information read in step S22 designates a FAX job. If the job is a FAX job, the process proceeds to step S27. If the job is not a FAX job, the process proceeds to step S29. It is then checked in step S27 whether the history of the FAX job has been requested. If the outcome of step S27 is yes, the process proceeds to step S28. If the result of step S27 is no, the process proceeds to step S35. In step S28, the history of the FAX job read in step S22 is added to the data to be returned to the print server 110, and the process then proceeds to step S35.

In step S29, it is determined whether the job history information read in step S22 indicates a personal box job. If the job is a personal box job, the process proceeds to step S30. If the job is not a personal box job, the process proceeds to step S32.

It is then checked in step S30 whether the history of the personal box job has been requested. If the outcome of step S30 is yes, the process proceeds to step S31. If the result of step S30 is no, the process proceeds to step S35. In step S31, the history of the personal box job read in step S22 is added to the data to be returned to the print server 110, and the process then proceeds to step S35.

In step S32, it is determined whether the job history information read in step S22 designates a PDL print job. If the job is a PDL print job, the process proceeds to step S33. If the job is not a PDL print job, the process proceeds to step S35. It is checked in step S33 whether the history of the PDL print job has been requested. If the outcome of step S33 is yes, the process proceeds to step S34. If the result of step S33 is no, the process proceeds to step S35. In step S34, the history of the PDL print job read in step S22 is added to the data to be returned to the print server 110, and the process then proceeds to step S35.

In step S35, it is determined whether the job history information read in step S22 is the final history information stored in the RAM 111. If the outcome of step S35 is yes, the process proceeds to step S36. If the result of step S35 is no, the process returns to step S22. In step S36, the read history information is transmitted to the print server 110. At this time, if the transmission of the history information in response to a history inquiry cannot be performed, (because, for example, the job history was not stored as a result of a user selection mode in FIG. 8), the corresponding message is sent to the print server 110. The print server 110 then transmits the information to the terminal on the LAN that has inquired about the job history, and the terminal displays the information.

Preferably, when the job history relates to the user information, such as the personal box job and the PDL print job, only the history information related to the user who made the inquiry will be picked up and transmitted.

In this embodiment, a program in accordance with the flow charts shown in FIGS. 9 and 11 may be stored in a storage device within the controller 109 and then executed, thereby enabling the implementation of the aforementioned control method in another apparatus.

As is seen from the foregoing description, according to the foregoing embodiment, the history of the jobs performed in the digital copying machine for executing a plurality of jobs is stored and displayed, thereby enabling the user to reliably check the execution result of the jobs.

The present invention may be applied to a system formed of a plurality of apparatuses (for example, a host computer, an interface device, a reader, a printer, etc.) or to a single apparatus (for example, a copying machine or a facsimile machine).

In another embodiment of the present invention, software program code for implementing the above-described functions may be supplied to a computer (a CPU or an MPU) within the system or within the apparatus connected to the above-described devices. Then, the aforementioned devices may be operated in accordance with the program stored in the computer of the system or the apparatus, so that the above-described functions can be implemented.

In this case, program code itself and means for supplying the program code to the computer (e.g., a storage medium for storing the program code therein) constitute the present invention.

Examples of the storage medium for storing the program code include a floppy disk, a hard disk, an optical disc, a magneto-optical disk, a compact disc-read only memory (CD-ROM), a magnetic tape, a non-volatile memory card, and a ROM.

The function of the foregoing embodiment can be implemented not only by running the program code read by the computer, but also by executing the processing by, for example, an operating system (OS) or another application software program running in the computer in cooperation with the program code.

The present invention may also be implemented by writing the program code read from the storage medium into a memory provided for a feature expansion board inserted into a computer or a feature expansion unit connected to the computer. Then, a CPU provided for the feature expansion board or the feature expansion unit partially or wholly executes the processing based on the instructions of the program code, thereby implementing the above-described functions.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for processing data transfer jobs, comprising:
    a first memory that (i) inputs and stores data for each of a plurality of jobs, (ii) transfers the data for each of the plurality of jobs to an output device, and (iii) inputs a selection of whether or not history information for at least one of the plurality of jobs is to be stored;
    a second memory;
    a controller that, when a transfer of data from the first memory has ended for a given job, stores history information for the given job in said second memory in accordance with the input selection of whether or not history information for at least one of the plurality of jobs is to be stored; and
    an interface circuit that receives a status inquiry and forwards the status inquiry to said controller,
    wherein upon receipt of the status inquiry, said controller retrieves the history information from said second memory stored in accordance with the input selection and, if the history information was stored, sends the retrieved history information to said interface circuit.

2. The apparatus according to claim 1, wherein said first and second memories are located in the same physical device.

3. The apparatus according to claim 1, wherein the history information indicates whether the transfer of data for a given job has terminated normally, terminated abnormally, or terminated as a result of a stop instruction received from a user.

4. The apparatus according to claim 1, wherein the status inquiry includes information that specifies at least one category of data transfer job, and said controller sends to said interface circuit history information corresponding only to the specified at least one category of data job.

5. The apparatus according to claim 1, wherein the output device comprises a printer.

6. A data processing apparatus comprising:
    connection means for connecting to an external device;
    input means for inputting (i) a first instruction to execute a job and (ii) a second instruction which indicates that the external device is to be informed of a result of a processing of the job or which indicates that the external device is not to be informed of a result of a processing of the job;
    processing means for processing the job based on the instruction input by said input means; and
    informing means for informing the external device of the result of the job processing executed by said processing means through said connection means when the external device is to be informed of the result of the job processing.

7. An apparatus according to claim 6, further comprising storage means for storing the result of the job processing in correspondence with a job type, wherein said informing means informs said storage means of the result of the job processing.

8. An apparatus according to claim 7, wherein said storage means stores the result of the job processing together with time information.

9. An apparatus according to claim 7, wherein said storage means selectively stores the result of the job processing according to the job type.

10. An apparatus according to claim 6, wherein said informing means informs the result of the job processing in response to an instruction provided from the external device connected to said connection means.

11. An apparatus according to claim 6, wherein said connection means is connected to a network for connecting a plurality of terminals and said informing means informs one of the plurality of terminals connected to the network of the result of the job processing.

12. An apparatus according to claim 11, wherein said informing means informs the one of the plurality terminals of the result of the job in correspondence with a user inquiry made at one of the plurality of terminals.

13. A data processing apparatus according to claim 6, wherein the second instruction also indicates that the result of a processing of a job is to be stored in a storage medium or indicates that the result of a processing of a job is not to be stored in a storage medium.

14. A control method of a data processing apparatus executing a job, comprising the steps of:

discriminating a result of a job executed by the data processing apparatus;

determining if an external device should be informed of the result based on an input which indicates that the external device is to be informed of a result of a processing of the job or which indicates that the external device is not to be informed of a result of a processing of the job; and informing an external device connected to said data processing apparatus of the discriminated result to the job if said determining step determines that the external device is to be informed of the result of the job.

15. A control method according to claim 14, further comprising a step of storing the result of the job in correspondence with a job type, wherein the informing step informs the external device of the result of the job stored in said storing step.

16. A computer readable program, stored in a storage medium, for controlling a data processing apparatus executing a job, said computer readable program comprising the steps of:

discriminating a result of a job executed by the data processing apparatus;

determining if an external device should be informed of the result based on an input which indicates that the external device is to be informed of a result of a processing of the job or which indicates that the external device is not to be informed of a result of a processing of the job; and informing an external device connected to said data processing apparatus of the discriminated result to the job if said determining step determines that the external device is to be informed of the result of the job.

* * * * *

UNITED STATES PATENT AND TRADEMARK OFFICE
CERTIFICATE OF CORRECTION

PATENT NO. : 6,952,278 B2 Page 1 of 1
APPLICATION NO. : 09/314123
DATED : October 4, 2005
INVENTOR(S) : Nobuaki Miyahara et al.

It is certified that error appears in the above-identified patent and that said Letters Patent is hereby corrected as shown below:

COLUMN 12:
      Line 17, "readable" should read --executable--.
      Line 17, "storage" should read --computer readable--.
      Line 20, "readable" should read --executable--.

Signed and Sealed this

Twenty-eighth Day of November, 2006

JON W. DUDAS
*Director of the United States Patent and Trademark Office*